US012519726B2

(12) United States Patent
Sangli et al.

(10) Patent No.: US 12,519,726 B2
(45) Date of Patent: Jan. 6, 2026

(54) ZONING CONFIGURATION AND MODEL FOR AN INTERNET PROTOCOL STORAGE FABRIC

(71) Applicant: Avago Technologies International Sales Pte. Limited, Singapore (SG)

(72) Inventors: Aruna Sangli, San Jose, CA (US);
Anand Arora, Pleasanton, CA (US);
Derek Asir Muthurajan Caleb, Mountain House, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 89 days.

(21) Appl. No.: 18/640,538

(22) Filed: Apr. 19, 2024

(65) Prior Publication Data
US 2025/0330423 A1    Oct. 23, 2025

(51) Int. Cl.
G06F 15/173   (2006.01)
H04L 41/0894   (2022.01)
H04L 45/24   (2022.01)
H04L 45/76   (2022.01)

(52) U.S. Cl.
CPC ......... *H04L 45/76* (2022.05); *H04L 41/0894* (2022.05); *H04L 45/245* (2013.01)

(58) Field of Classification Search
CPC .... H04L 45/76; H04L 45/245; H04L 41/0894
See application file for complete search history.

(56) References Cited

U.S. PATENT DOCUMENTS

2018/0219947 A1\* 8/2018 Dasari ................. H04L 47/2425
2022/0283729 A1\* 9/2022 Desanti ................. G06F 3/0655

\* cited by examiner

*Primary Examiner* — Joseph R Maniwang
(74) *Attorney, Agent, or Firm* — Kim & Stewart LLP

(57) ABSTRACT

An example method of configuring connection between hosts and storage devices over an Internet Protocol (IP) network includes: defining, by a server, a first group of the hosts and a first group of the storage devices, the hosts connected to a first IP network and the storage devices connected to a second IP network; defining an IP zone that includes a connection between the first group of hosts and the first group of storage devices over a link between the first IP network and the second IP network; generating, according to an IP zone policy for the IP zone, an IP configuration for the first groups of hosts and storage devices, the first IP network, and the second IP network; and deploying, to implement the IP zone, the IP configuration to the first groups of hosts and storage devices, the first IP network, and the second IP network.

20 Claims, 10 Drawing Sheets

ZONING CONFIGURATION AND MODEL FOR AN INTERNET PROTOCOL STORAGE FABRIC

BACKGROUND

In a data center, host computers ("hosts") connect to external storage devices that are shared ("shared storage"). In some data centers, each host includes a host bus adaptor (HBA) through which input/output (IO) operations are sent to the shared storage over a fibre channel (FC) network. The shared storage can include storage arrays, such as a storage area network (SAN), network attached storage (NAS), or the like. Shared storage devices can include magnetic disks, solid-state disks, flash memory, and the like, as well as combinations thereof.

In some data centers, hosts access shared storage using network interface cards (NICs) over an Internet Protocol (IP) network rather than using HBAs connected to an FC network (referred to as IP storage or (IPS)). IP storage leverages standard IP networks and Ethernet technology, rather than needing specialized hardware used for an FC network, making it cost-effective, flexible, and scalable. Hosts can access shared storage over an IP network using well known protocols, such as Internet Small Computer System Interface (iSCSI), which allows SCSI commands to be encapsulated in Transmission Control Protocol (TCP)/IP packets and transmitted over IP networks. Another protocol for sharing storage over an IP network is nonvolatile memory express (NVMe) over TCP/IP networks. In some data centers, some storage is provided using IP networks while other storage is provided using FC networks.

For IP storage, end-to-end configuration of IP devices, including hosts, storage devices, and networks, may require a large number of steps. A user may need to configure host and storage devices with IP networking parameters, configure host and storage connection to IP fabrics, configure switches, routers, etc. in the IP networks, and the like. This involves the user creating many entities, such as link aggregation groups (LAGs), virtual routing functions (VRFs), virtual local area networks (VLANs), static routes, to name a few. This can be a time-intensive and error-prone process for a user as the number of devices and the size of the network increases.

SUMMARY

In embodiments, a method of configuring connection between hosts and storage devices over an Internet Protocol (IP) network is described. The method includes defining, by a server, a first group of the hosts and a first group of the storage devices, the hosts connected to a first IP network and the storage devices connected to a second IP network. The method includes defining, by the server, an IP zone that includes a connection between the first group of hosts and the first group of storage devices over a link between the first IP network and the second IP network. The method includes generating, by the server according to an IP zone policy for the IP zone, an IP configuration for the first group of hosts, the first group of storage devices, the first IP network, and the second IP network. The method includes deploying, by the server, the IP configuration to the first group of hosts, the first group of storage devices, the first IP network, and the second IP network.

Further embodiments include a non-transitory computer-readable storage medium comprising instructions that cause a computer system to carry out the above method, as well as a computer system configured to carry out the above method.

DETAILED DESCRIPTION

Figure 1:
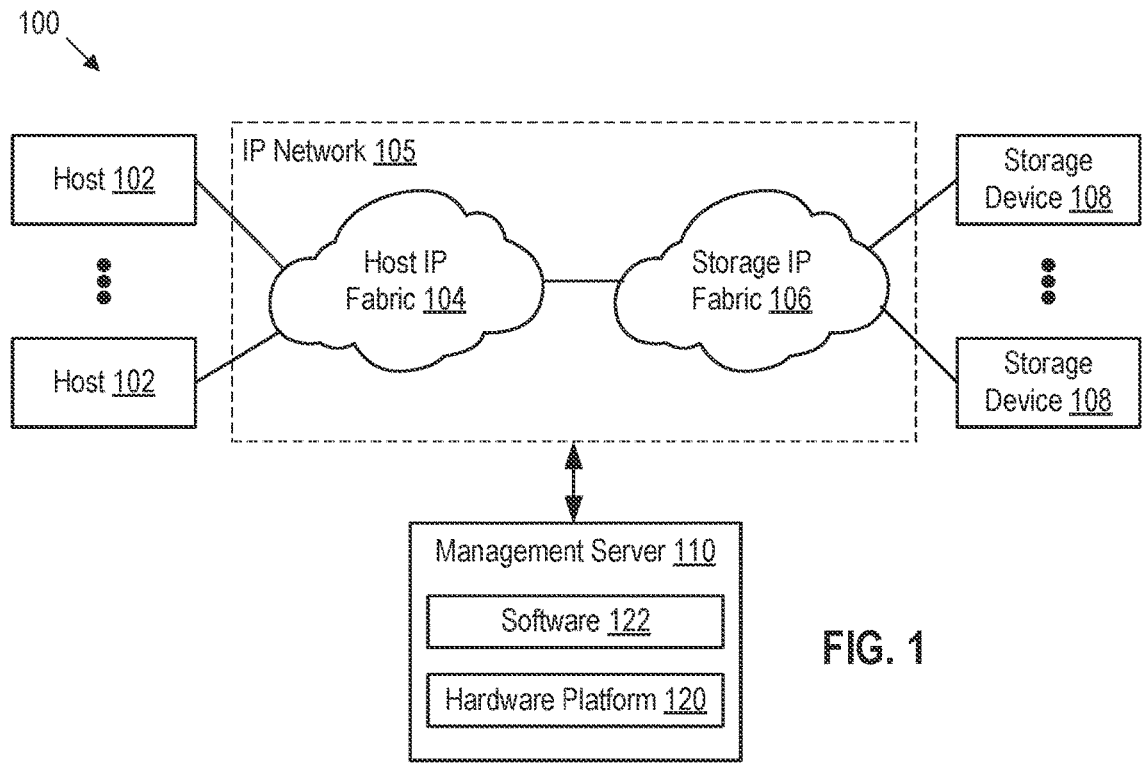
FIG. 1 is a block diagram depicting a computing system according to embodiments.

FIG. 1 is a block diagram depicting a computing system 100 according to embodiments. Computing system 100 includes host computers ("hosts") 102 and storage devices 108 connected to an IP network 105. A device or network may be connected to another device or network either directly or indirectly through other devices/networks. For example, a device or network can be connected to another device or network if there is a communication path between the device/network and the other device/network. Each of hosts 102 can be a physical host (e.g., a computer executing a host operating system on a hardware platform) or a virtual host. A virtual host can be a virtual computing instance, such as a virtual machine (VM) or container, which operates on a physical host under management of virtualization software (e.g., a hypervisor). Each storage device can include magnetic disks, solid-state disks, flash memory, and the like, as well as combinations thereof.

Hosts 102 are connected to a host IP fabric 104 of IP network 105. Storage devices 108 are connected to a storage IP fabric 106 of IP network 105. Each of host IP fabric 104 and storage IP fabric 106 can be any type of IP network known in the art. In some cases, host IP fabric 104 is referred to as a "first IP network" and storage IP fabric 106 is referred to as a "second IP network." Host IP fabric 104 comprises switches, routers, and the like that facilitate communication among hosts 102 and between hosts 102 and external entities (not shown). Storage IP fabric 106 comprises switches, routers, and the like that together with storage devices 108 implement a SAN. Host IP fabric 104 is connected to storage IP fabric 106 to facilitate communication between hosts 102 and storage devices 108 of the SAN.

A management server 110 is connected to network 105. Management server 110 comprises software 122 executing on a hardware platform 120, which can include conventional devices, such as central processing units (CPUs), memory, NICs, and the like. Hardware platform 120 can be physical hardware or virtual hardware (e.g., management server 110 can execute on a physical host or a virtual computing instance, such as in VM(s) and/or container(s). Management server 110 manages the network configuration of hosts 102, IP network 104, and storage devices 108 and performs various functions and processes as described herein. In particular, management server 110 allows for IP configuration of computing system 100 using IP zoning as described further herein.

Figure 2:
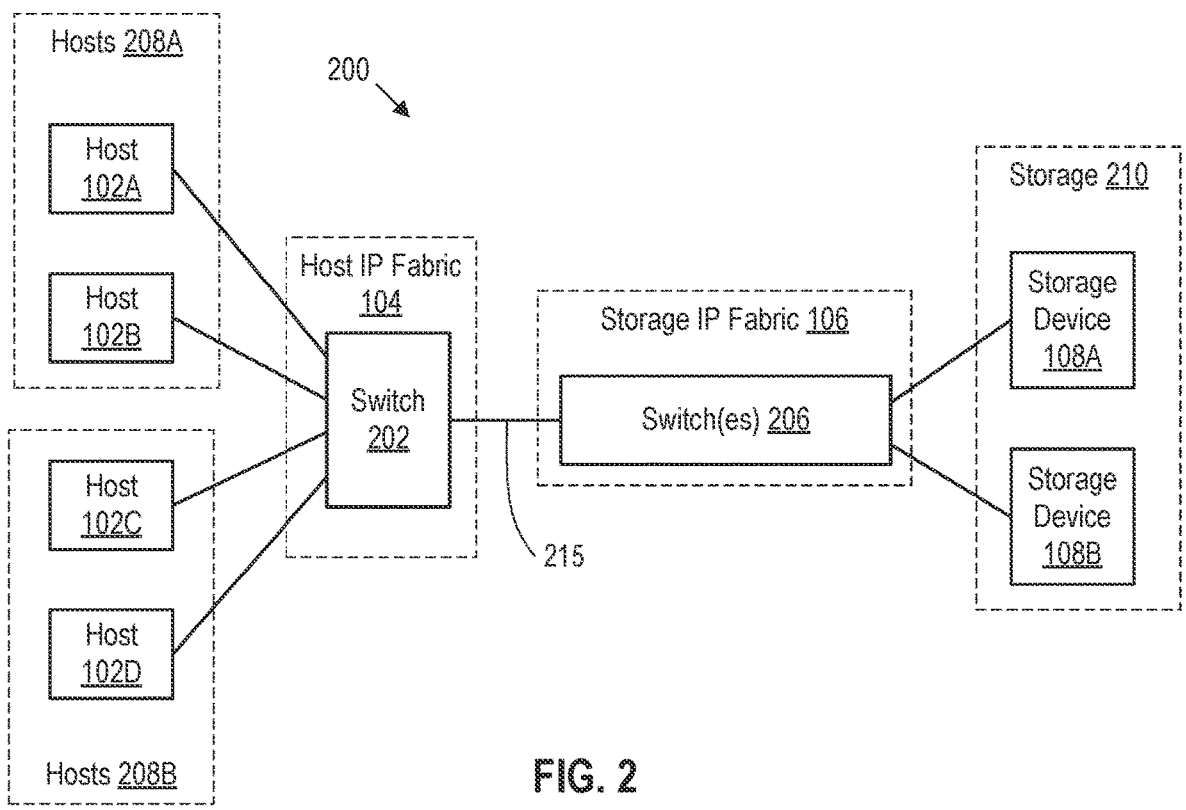
FIG. 2 is a block diagram depicting an example computing system according to embodiments.

FIG. 2 is a block diagram depicting an example computing system 200 according to embodiments. Computing system 200 is an implementation of computing system 100 that will be used for discussion of various embodiments herein. In the example, computing system 200 includes hosts 208A that include a host 102A and a host 102B. Computing system 100 includes hosts 208B that include a host 102C and a host 102D. Each set of hosts 208A and 208B is connected to a switch 202 of host IP fabric 104. Storage 210 includes a storage device 108A and a storage device 108B. Storage 210 is connected to one or more switches 206 of storage IP fabric 106. Switch 202 is connected to switch 206 over a link 215.

Computing system 200 shows a simplified example of two sets of hosts, 208A and 208B, each needing access to storage devices 108A and 108B over IP network 105. IP network 105 is simplified such that host IP fabric 104 includes switch 202 and storage IP fabric 106 includes switch(es) 206. In practical implementations, there can be many more hosts and storage devices, as well as more complex network device topologies for host IP fabric 104 and storage IP fabric 106. Example computing system 200 is provided for purposes of clarity by example when discussing the IP zoning techniques herein.

Figure 3:
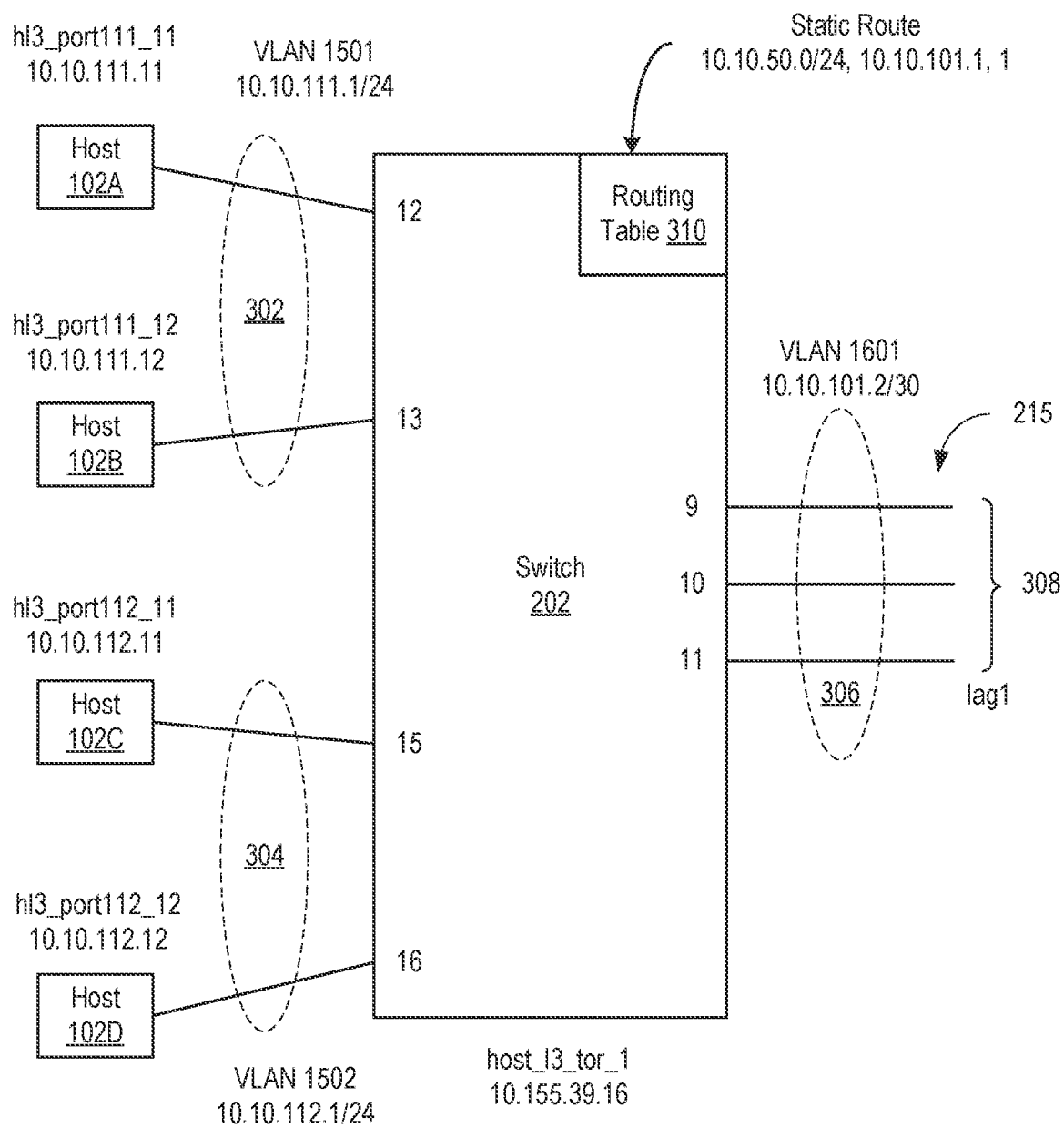
FIG. 3 is a block diagram depicting an IP configuration of hosts and a host IP fabric according to embodiments.

FIG. 3 is a block diagram depicting an IP configuration of hosts and a host IP fabric according to embodiments. An IP configuration may include one or more parameters for one or more network objects. Example parameters include IP addresses, IP subnets, IP gateways, domain name service (DNS) addresses, and the like. Example network objects include hosts, switches, routers, and the like. Continuing with the example of FIG. 2, each host 102A-D includes a host identifier and an IP address. Host 102A is referred to as "hl3_port111_11" and has an IP address of 10.10.111.11. Host 102B is referred to as "hl3_port111_12" and has an IP address of 10.10.111.12. Host 102C is referred to as "hl3_port112_11" and has an IP address of 10.10.112.11. Host 102D is referred to as "hl3_port12_12" and has an IP address of 10.1.112.12. Switch 202 is referred to as "host_l3_tor 1" and has an IP address of 10.155.39.16.

Host 102A is connected to port 12 of switch 202. Host 102B is connected to port 13 of switch 202. Switch 202 is configured to implement a VLAN 302 of ID 1501 that services a subnet 10.10.111.1/24. Ports 12 and 13 are part of VLAN 302 and thus hosts 102A and 102B have IP addresses in the subnet thereof. Each of hosts 102A and 102B is configured with a gateway of 10.10.111.1 and a subnet mask of 255.255.255.0.

Host 102C is connected to port 15 of switch 202. Host 102D is connected to port 16 of switch 202. Switch 202 is configured to implement a VLAN 304 of ID 1502 that services a subnet 10.10.112.1/24. Ports 15 and 16 are part of VLAN 304 and thus hosts 102C and 102D have IP addresses in the subnet thereof. Each of hosts 102C and 102D is configured with a gateway of 10.10.112.1 and a subnet mask of 255.255.255.0.

Switch 202 is configured to implement a VLAN 306 of ID 1601 that services a subnet 10.10.101.2/30. Ports 9, 10, and 11 of switch 202 are part of VLAN 306. Switch 202 is further configured to aggregate ports 9, 10, and 11 as part of a link aggregation group (LAG) 308 designated lag1. A LAG may be a combination of network links in parallel. LAG 308 implements link 215 with storage IP fabric 106. In embodiments, switch 202 is a Layer 3 (L3) switch that includes a routing table 310. Routing table 310 is configured with a static route such that traffic with a destination IP in the 10.10.50.0/24 subnet is routed to the IP address 10.10.101.1 with a metric 1. As described in the example of FIG. 4 below, the subnet 10.10.50.0/24 includes the storage devices 108A and 108B. The subnet 10.10.101.0/30 of VLAN 306 includes two usable IP addresses of 10.10.101.1 and 10.10.101.2, where switch 202 has the IP address 10.10.101.2 in VLAN 306 and switch 206 has the IP address 10.10.101.1 in VLAN 306. Thus, traffic from hosts 102A-D that is destined for storage 210 is routed by switch 202 to switch 206.

In the example, hosts 102A and 102B are in one group and can communicate with each other over VLAN 302. Hosts 102C and 102D are in another group and can communicate with each other over VLAN 304. VLANs 302 and 304 isolate the hosts in the first group from the hosts in the second group. However, each of hosts 102A-102D need access through IP network 105 to both storage devices 108A and 108B.

Figure 4:
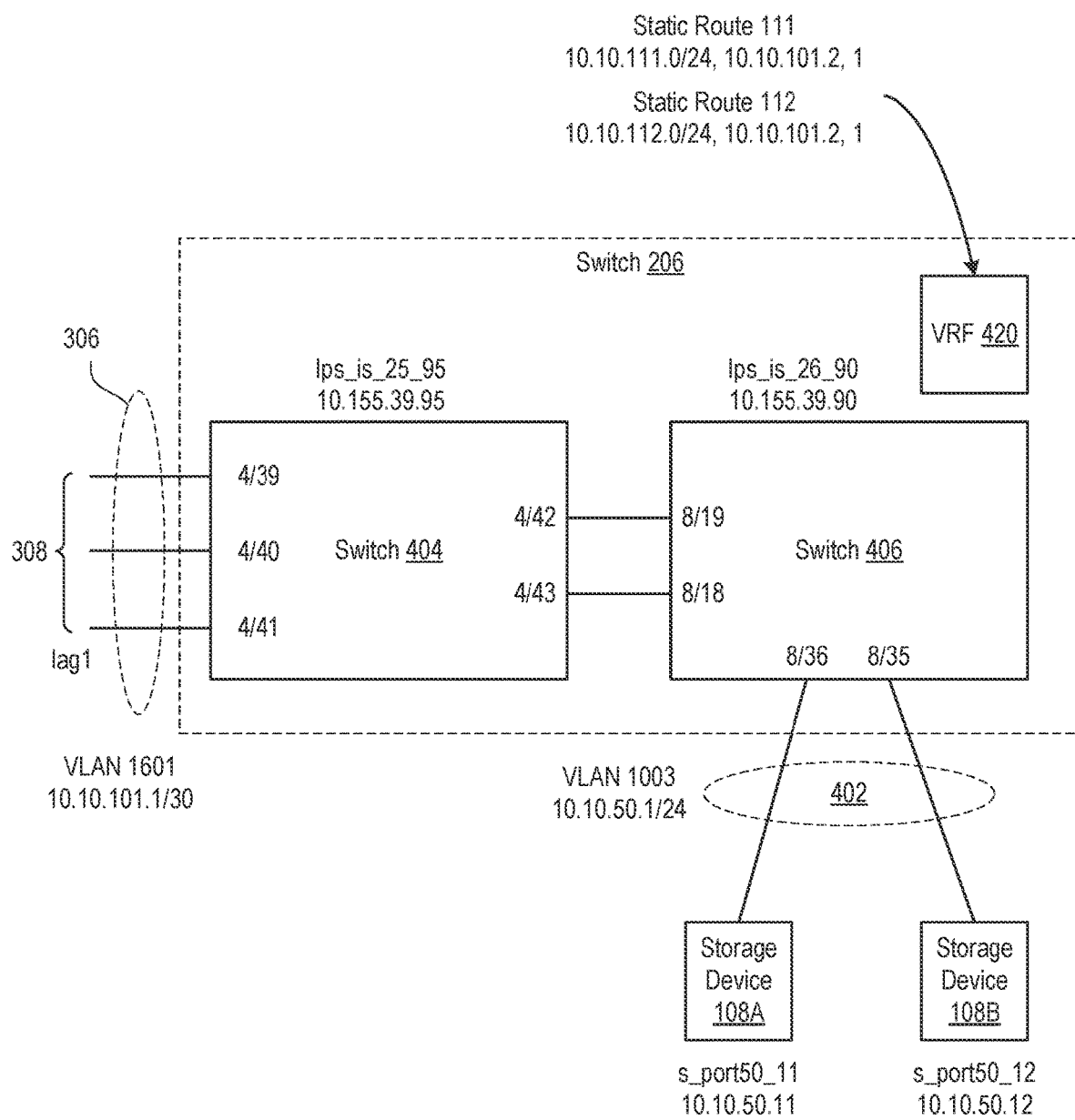
FIG. 4 is a block diagram depicting an IP configuration of storage devices and a storage IP fabric according to embodiments.

FIG. 4 is a block diagram depicting an IP configuration of storage devices and a storage IP fabric according to embodiments. In the embodiment, which continues the example of FIGS. 2-3, storage IP fabric 106 comprises two switches 404 and 406. For example, storage IP fabric 106 can include a single logical switch with one or more blades within a chassis or can include multiple logical switches created on multiple chasses. Further, although two switches 404 and 406 are shown in the example, storage IP fabric 106 can have other topologies. Switch 404 has an identifier "Ips_is_25_95" with an IP address of 10.155.39.95. Switch 406 has an identifier "Ips_is_26_90" with an IP address of 10.155.39.90.

In the example, switch 404 is a logical switch created from the ports on a blade located in slot 4 of a chassis and its ports are identified with the format slot/port #. Switch 404 includes ports 4/39, 4/40, and 4/41 configured as LAG 308 with the identifier lag1. Switch 404 is configured to implement VLAN 306 of ID 1601 that services the subnet 10.10.101.2/30. Ports 4/39, 4/40, and 4/41 of switch 404 are part of VLAN 306. VLAN 306 is created on switch 404 with ID 1601 and has a gateway address of 10.10.101.1 and a subnet mask of 30.

In this example, switch 406 a logical switch created from the ports on a blade located in slot 8 of a chassis. Switch 406 includes ports 8/19 and 8/18. Port 4/42 of switch 404 is connected to port 8/19 of switch 406. Port 4/43 of switch 404 is connected to port 8/18 of switch 406. Port 8/36 of switch 406 is connected to storage device 108A. Port 8/35 of switch 406 is connected to storage device 108B. Switch 406 is referred to as "Ips_is_26_90" and has an IP address of 10.155.39.90. Storage device 108A is referred to as "s_port50_11" and has an IP address of 10.10.50.11. Storage device 108B is referred to as "s_port50_12" and has an IP address of 10.10.50.12. Switch 406 implements a VLAN 402 having an ID of 1003. Ports 8/36 and 8/35 are part of VLAN 402. VLAN 402 services a subnet 10.10.50.1/24. Storage devices 108A and 108B are configured with a gateway of 10.10.50.1 and a subnet mask of 255.255.255.0.

storage IP fabric 106 is configured with a virtual routing function and forwarding (VRF) 420. VRF 420 implements a virtual routing table and storage IP fabric 106 can have any number of VRFs to create different virtual routers. VRF 420 is configured with two static routes: traffic destined for 10.10.111.0/24 (e.g., VLAN 302 that services hosts 102A and 102B) is routed to IP address 10.10.101.2 (e.g., VLAN 306 on switch 202). Traffic destined for 10.10.112.0/24 (VLAN 304 that services hosts 102C and 102D) is routed to IP address 10.10.101.2 (VLAN 306 on switch 202).

As shown in FIGS. 3-4, there are many parameters in the IP configuration to configure across the hosts, storage devices, and IP fabrics, such as IP addresses, gateways, subnet masks, VLANs, LAGs, static routes, VRFs, and the like. A user can interact with management service 110 to configure an IP networking model with a specific IP configuration manually. An IP networking model or IP model is a model of the computing system that defines networking in terms of network layer semantics (e.g., layer 3 IP addresses, layer 2 VLANs, etc.). An IP configuration is a specific configuration of an IP model that includes parameters having specific values (e.g., VLANs with specific subnets, specific host IP addresses, specific storage IP addresses, specific static routes, etc.). However, in embodiments, the user can alternatively interact with management service 110 to configure the computing system using an IP zone model to avoid the time-intensive and error-prone task of manual configuration. An IP zone model is a model of the computing system that defines networking in terms of abstract semantics. An IP zone configuration or IP zone config is a specific configuration of an IP zone model having IP zone members, IP zones, and IP zone policy, as discussed further below.

Figure 5:
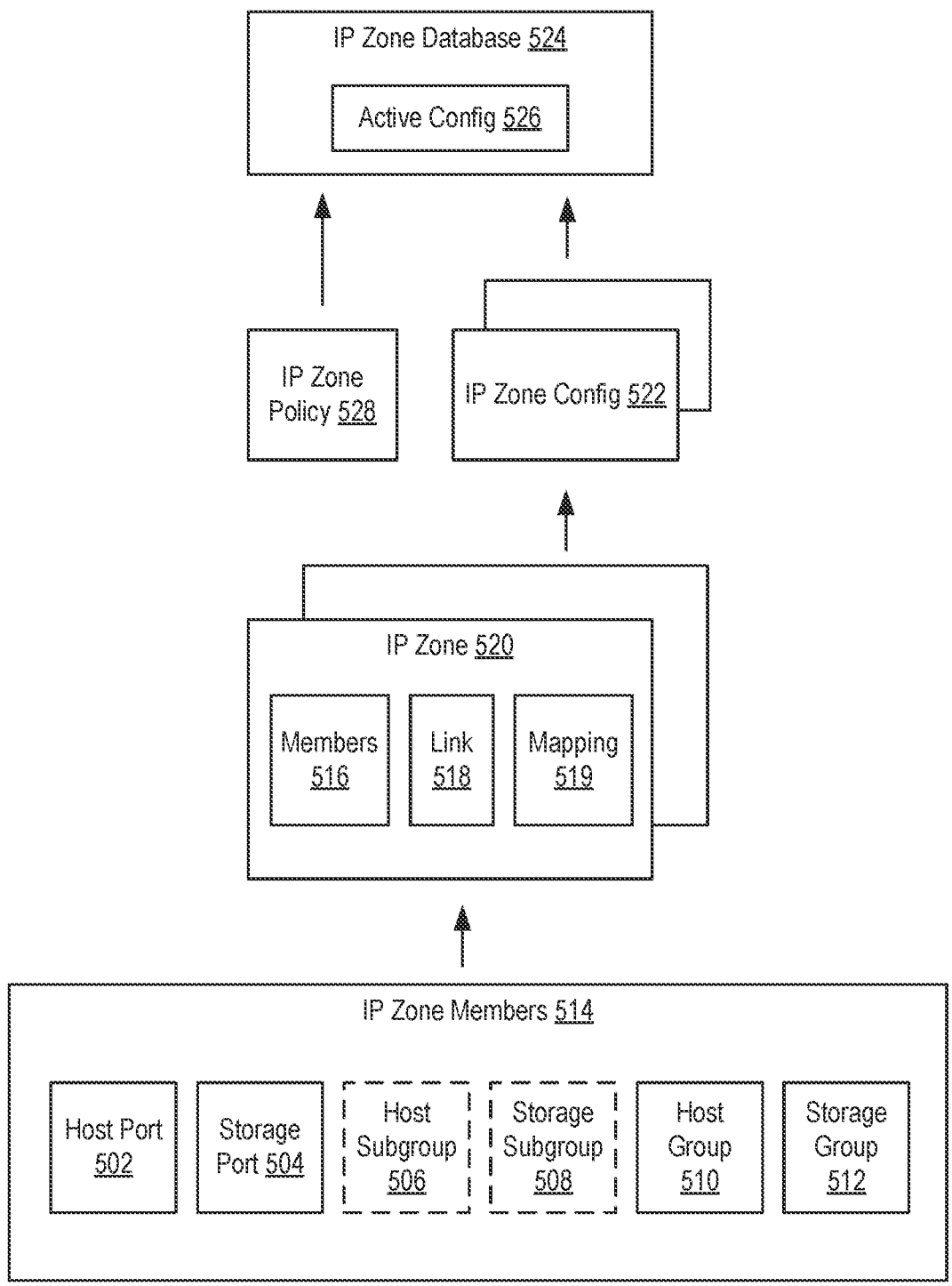
FIG. 5 is a block diagram depicting nomenclature and hierarchy of IP zoning according to embodiments.

FIG. 5 is a block diagram depicting nomenclature and hierarchy of an IP zone model according to embodiments. At a base level of the hierarchy, IP zone members 514 comprise host ports 502, storage ports 504, host groups 510, and storage groups 512. In some embodiments, host and storage groups can be further divided into host subgroups 506 and storage subgroups 508. A subgroup is a group that is encompassed by another group (e.g., a host subgroup 506 is encompassed by a host group 510). An IP zone may be a logical grouping objects in a network. For example, IP zones 520 each comprise members 516, a link 518, and a mapping 519. Members 516 of an IP zone 520 comprise any of IP zone members 514. A mapping 519 is relation between specific members connected by a link (e.g., a mapping between a host group 510 and a storage group 512 connected by a link 518). A link 518 comprises a connection between members 516 defined in terms of a connection between the host IP fabric and the storage IP fabric. For example, a link 518 can be defined as a LAG between a switch in the host IP network (e.g., switch 202) and a switch in the storage IP network (e.g., switch 404). Objects that are a part of an IP zone may be referred to as being inside the IP zone. Conversely, objects that are not part of an IP zone may be referred to as being outside the IP zone.

An IP zone config 522 includes one or more IP zones 520. An IP zone database stores one or more IP zone configs 522, only one of which is designated as active ("active config 526"). IP zone database 524 also stores one or more IP zone policies 528. IP zone policy 528 specifies a policy to convert from the IP zoning model to the IP network model. IP zone policy 528 is a policy that defines permitted values for parameters in an IP configuration (permitted values being values that the parameters are allowed to have). The "permitted values" can be those defined and customized by the user. IP zone policy 528 includes, for example, permissible IP subnets for hosts/storage devices, permissible VLAN IDs, permissible VFR IDs, and the like. Management server 110 will use IP policy when generating an IP configuration of an IP network model from the IP zone model. An IP zone policy 528 can apply to multiple IP zone configs 522 or there can be unique IP zone policies 528 for each IP zone config 522.

Figure 6:
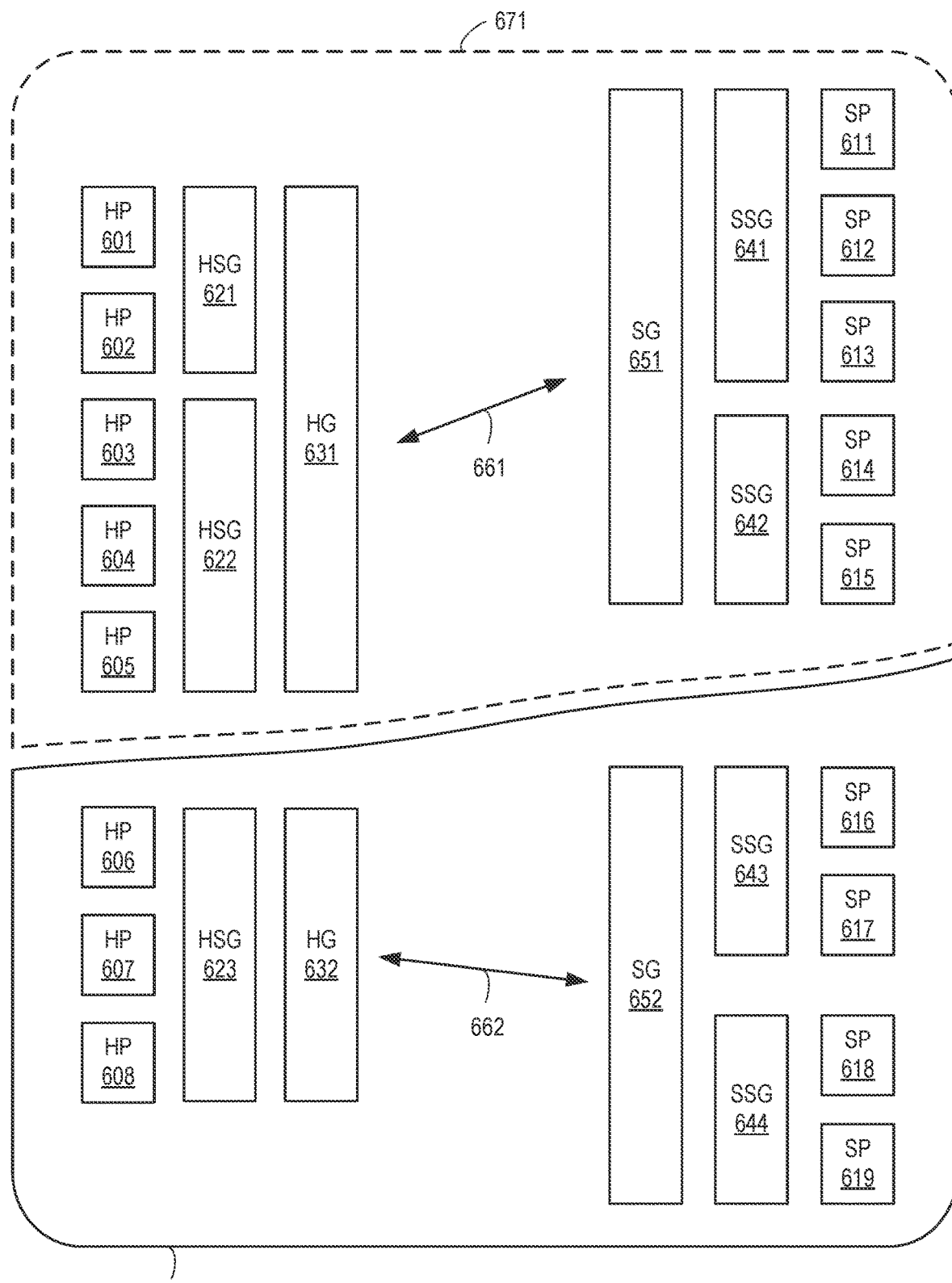
FIG. 6 is a block diagram depicting example IP zones according to embodiments.

FIG. 6 is a block diagram depicting example IP zones according to embodiments. A host subgroup (HSG) 621 includes host ports (HPs) 601 and 602. A host subgroup 622 includes host ports 603, 604, and 605. A host group (HG) 631 includes host subgroups 621 and 622. A host subgroup 623 includes host ports 606, 607, and 608. A host group 632 includes host subgroup 623.

A storage subgroup (SSG) 641 includes storage ports (SPs) 611, 612, and 613. A storage subgroup 642 includes storage ports 614 and 615. A storage subgroup 643 includes storage ports 616 and 617. A storage subgroup 644 includes storage ports 618 and 619. A storage group (SG) 651 includes storage subgroups 641 and 642. A storage group 652 includes storage subgroups 643 and 644. A link 661 connects host group 631 and storage group 651. A link 662 connects host group 632 and storage group 652. Host group 631, link 661, and storage group 651 comprise an IP zone 671. Host group 632, link 662, and storage group 652 comprise an IP zone 672. FIG. 6 shows just one example configuration and there can be any number of host ports, storage ports, host subgroups, storage subgroups, host groups, storage groups, links, and IP zones in various hierarchies.

Figure 7:
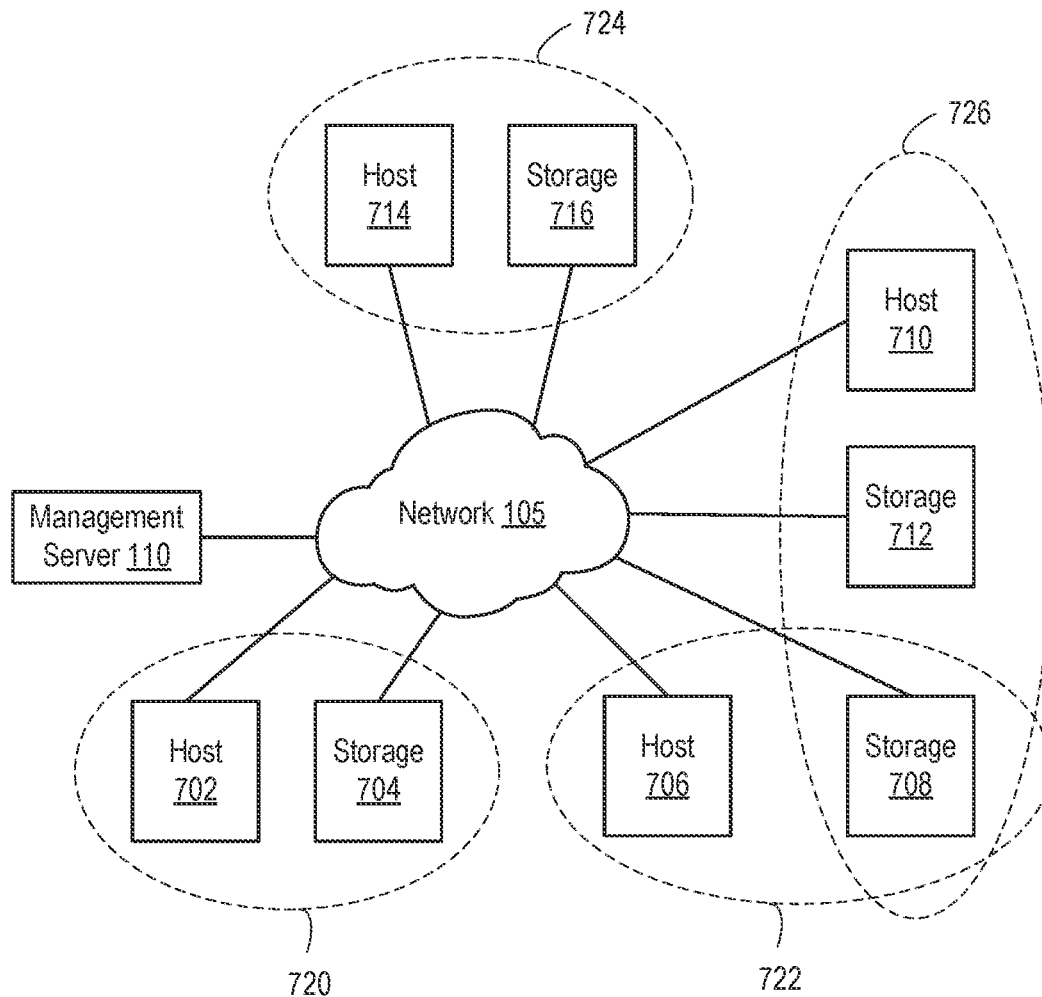
FIG. 7 is a block diagram depicting an example of IP zones according to embodiments.

FIG. 7 is a block diagram depicting example IP zones according to embodiments. FIG. 7 shows example IP zones from the perspective of hosts and storage devices. In the example, hosts 702, 706, 710, and 714 are connected to IP network 105. Storage devices 704, 708, 712, and 716 are also connected to IP network 105. Management service 110 is connected to IP network 105 and manages the hosts, the storage devices, and the network. A user or software interacts with management service 110 to define an IP zone model having IP zones 720, 722, 724, and 726. IP zone 720 includes host 702 and storage 704. IP zone 722 includes host 706 and storage 708. IP zone 726 includes host 710 and storage devices 708 and 712. IP zone 724 includes host 714 and storage 716. The links for IP zones 720, 722, 724, and 726 are not explicitly shown. FIG. 7 shows an example where a storage device 708 can be part of multiple IP zones 722 and 726.

Figure 8:
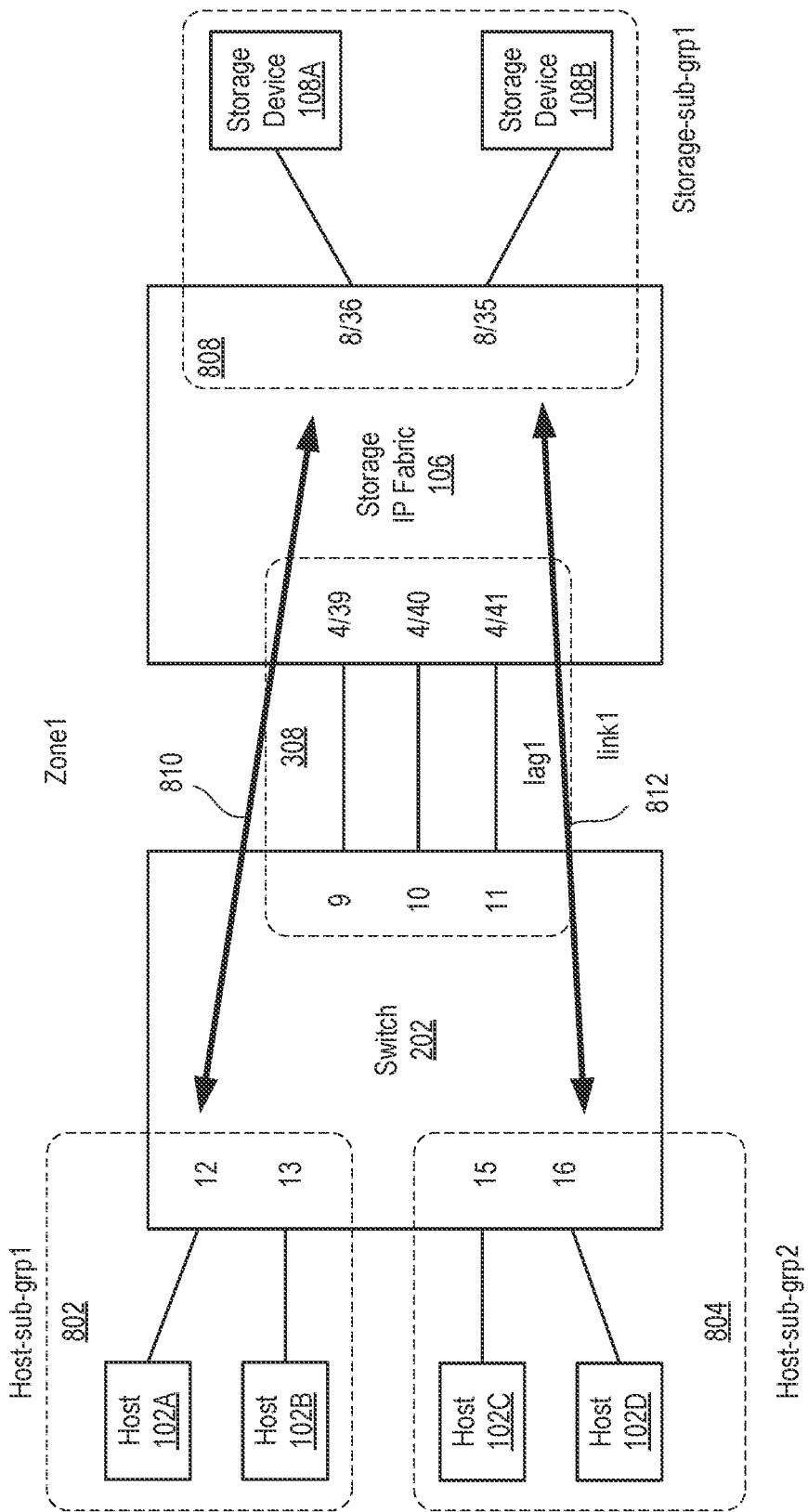
FIG. 8 is a block diagram depicting an IP zone model for the example computing system as shown in FIGS. 2-4 according to embodiments.

FIG. 8 is a block diagram depicting an IP zone model for the example computing system 200 as shown in FIGS. 2-4 according to embodiments. The IP zone model comprises a host subgroup 802 (designated "host-sub-grp1") and a host subgroup 804 (designated "host-sub-grp2"). Host subgroup 802 includes host ports 12 and 13 of switch 202, which are connected to hosts 102A and 102B, respectively. Host subgroup 804 includes host ports 15 and 16, which are connected to hosts 102C and 102D, respectively. The IP zone model includes a storage subgroup 808 (designated "storage-sub-grp1"). Storage subgroup 808 includes storage ports 8/36 and 8/35, which are connected to storage devices 108A and 108B, respectively. The IP zone model includes links 810 and 812. Link 810 connects host subgroup 802 to storage subgroup 808. Link 812 connects host subgroup 804 to storage subgroup 808. Links 810 and 812 are each defined as the LAG connection 308 between switch 202 and storage IP fabric 106. The IP zone model in FIG. 8 implements the desired topology in the example, namely, that hosts 102A and 102B can connect to each other and to either of storage devices 108A and 108B. Hosts 102C and 102D can connect to each other and either of storage devices 108A and 108B.

Figure 9:
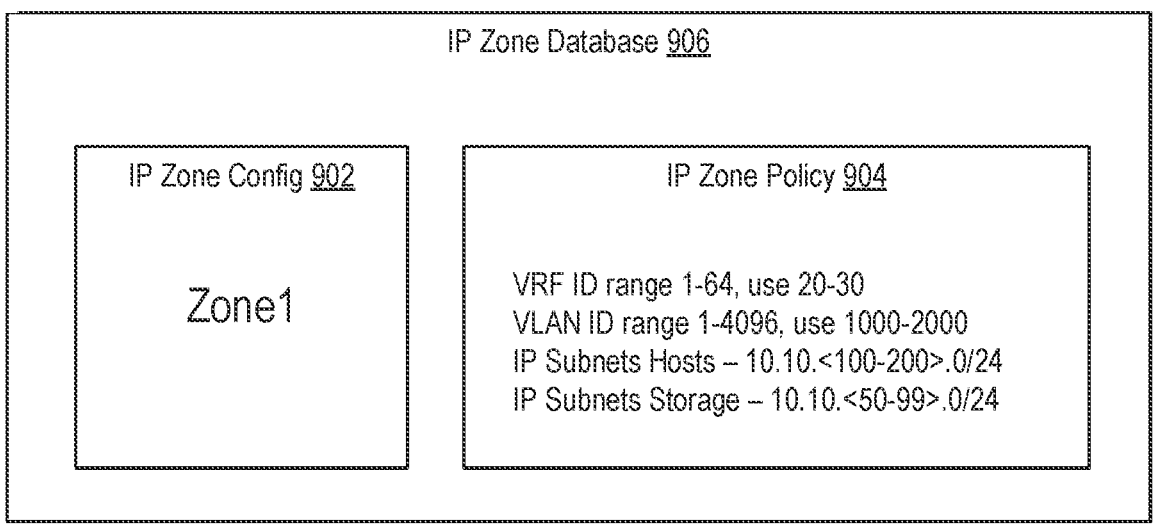
FIG. 9 is a block diagram depicting an IP zone database having the IP zone model of FIG. 8 according to embodiments.

FIG. 9 is a block diagram depicting an IP zone database 906 having the IP zone model of FIG. 8 according to embodiments. IP zone database 906 includes an IP zone config 902 and an IP zone policy 904. IP zone config 902 is active and includes the IP zone model of FIG. 8 designated as "zone1." In the example, IP zone policy 904 defines a VRF ID range 1-64 and permits use of IDs 20-30. IP zone policy 904 defines a VLAN ID range of 1-4096 and permits use of IDs 1000-2000. IP zone policy 904 permits IP subnets 10.10.<100-200>0.0/24 for hosts. IP zone policy 904 permits IP subnets 10.10.<50-99>0.0/24 for storage devices.

Figure 10:
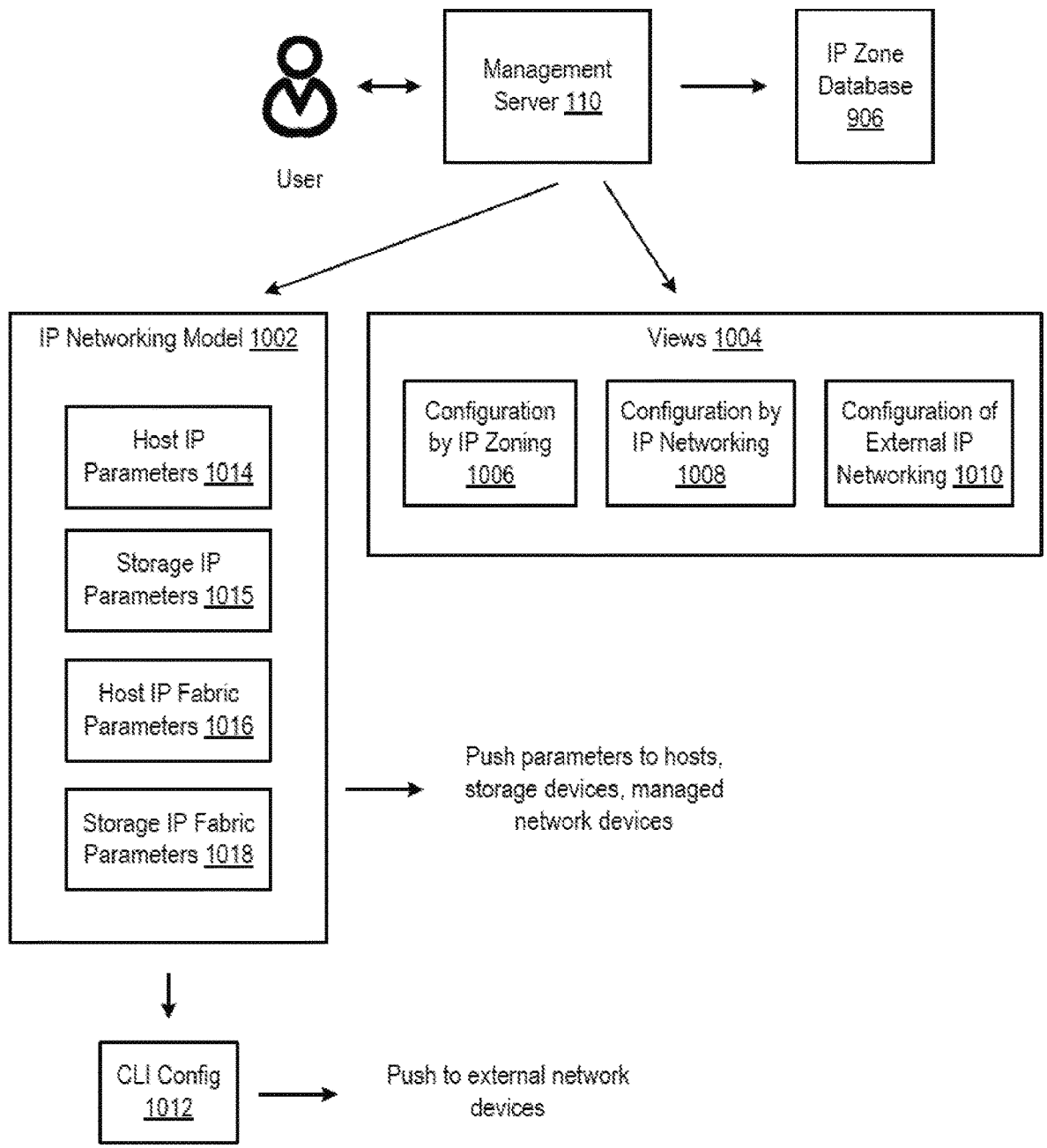
FIG. 10 is a block diagram depicting logical operation of the management server according to embodiments.

FIG. 10 is a block diagram depicting logical operation of the management server according to embodiments. A user (or software) interacts with management service 110 to define one or more IP zone models, which are stored in IP zone database 906. When a user (or software) defines an IP zone model, management service 110 generates an IP networking model 1002 by converting the IP zone model using its IP zone policy. IP networking model 1002 includes host IP parameters 1014, such as host IP addresses, gateway IP addresses, subnet masks, etc. used to configure network interfaces of hosts connected to IP zone member host ports. IP networking model 1002 includes storage IP parameters 1015, such storage IP addresses, gateway IP addresses, subnet masks, etc. used to configure network interfaces of storage devices connected to IP zone member storage ports. IP networking model 1002 includes host IP fabric parameters 1016, such as VLAN IDs, LAG configurations, static routes, etc. IP networking model 1002 includes storage IP fabric parameters 1018, such as VLAN IDs, LAG configurations, VRF IDs, static routes, and the like.

The user can interact with management service 110, which presents views 1004, including a configuration by IP zoning view 1006, a configuration by IP networking view 1008, and a configuration of external IP networking view 1010. Configuration by IP zoning view 1006 includes a graphic user interface (GUI) or the like to enter and display IP zone models. Configuration by IP zoning view 1006 includes fields for IP zone members, IP zones, IP zone configs, IP zone database, IP zone policy, and the like. Configuration by IP networking view 1008 includes a GUI or the like to enter and display IP networking models. Configuration by IP networking view 1008 includes fields for LAGS, VLANs, VRFs, static routes, and the like. Configuration of external IP networking view 1010 includes a GUI or the like to enter and display IP networking models for devices that are not managed by management server 110. Configuration of external IP networking view 1010 includes fields similar to those of configuration by IP networking view 1008. Management service 110 can deploy parameters to hosts, storage devices, and managed network devices. For unmanaged network devices, management service 110 can generate a command line interface (CLI) configuration or the like that can be consumed by the unmanaged network devices to affect the configuration as included in IP networking model 1002 and shown in configuration of external IP network view 1010.

Figure 11:
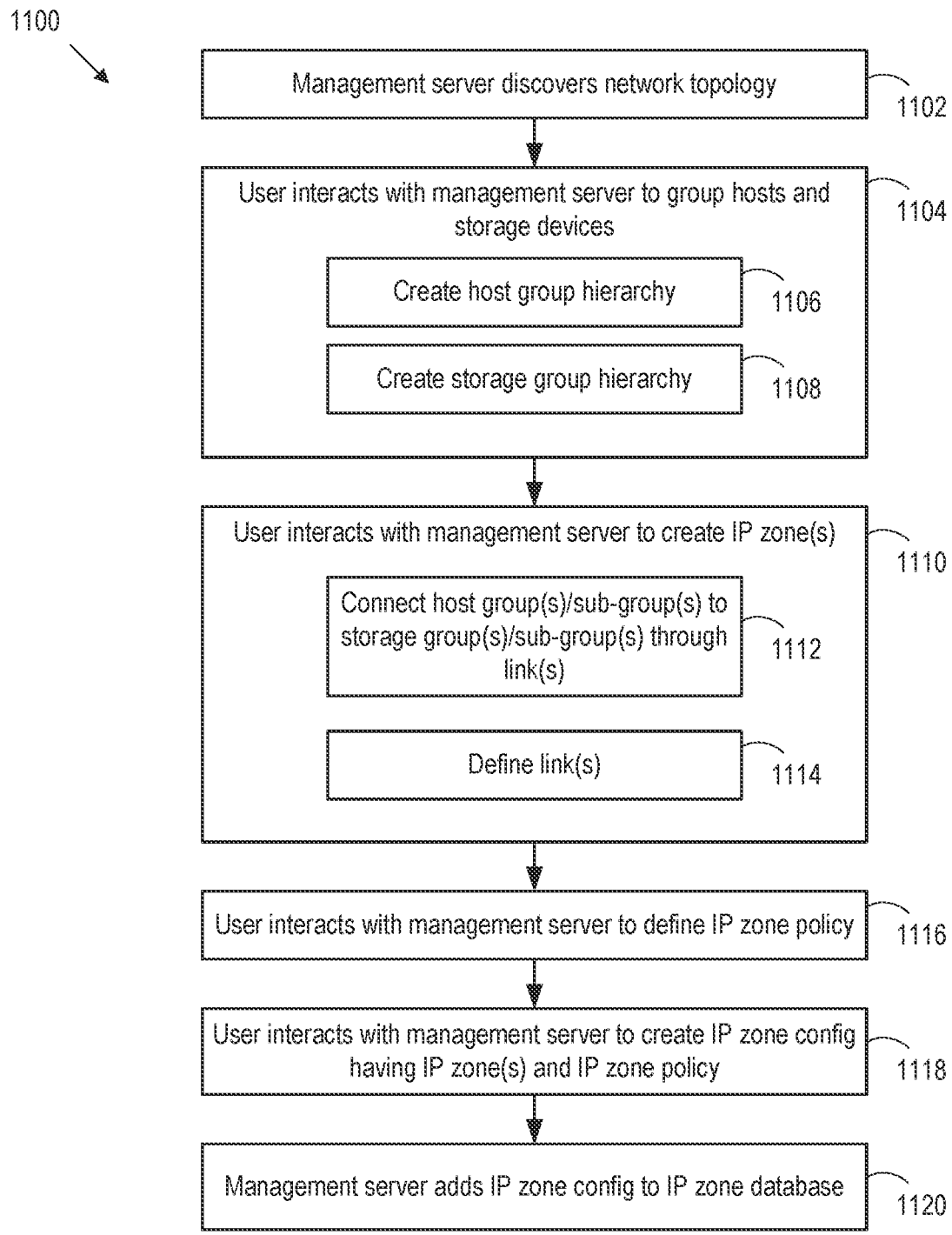
FIG. 11 is a flow diagram depicting a method of generating an IP zone model according to embodiments.

FIG. 11 is a flow diagram depicting a method 1100 of generating an IP zone model according to embodiments. The IP zone model can be implemented to establish a connection between hosts and storage devices over an IP network. "Connection" includes connection/communication with, and allowed control access to, the storage devices by the hosts. Method 1100 begins at step 1102, where management server 110 discovers the network topology of the computing system. The network topology includes the switches, routers, hosts, storage devices, ports connected to hosts, ports connected to storage devices, ports connected to network devices, and the like. At step 1104, a user (or software) interacts with management server 110 to group hosts and storage devices. For example, a user can define host subgroups, storage subgroups, host groups, storage groups, as discussed above. At step 1106, the user (or software) creates a host group hierarchy (e.g., as shown in FIG. 6). The host group hierarchy includes host subgroup(s), host group(s), or both. At step 1108, the user (or software) creates a storage group hierarchy (e.g., as shown in FIG. 6). The storage group hierarchy includes storage subgroup(s), storage group(s), or both.

At step 1110, the user (or software) interacts with management service 110 to create IP zone(s). For example, at step 1112, the user (or software) connects host group(s)/subgroup(s) to storage group(s)/subgroup(s) through link(s). At step 1114, the user (or software) defines the link(s) between host/storage groups.

At step 1116, the user (or software) interacts with management server 110 to define an IP zone policy. At step 1118, the user (or software) interacts with management server 110 to create an IP zone config having the IP zone(s) and the IP zone policy applied to the IP zone(s). At step 1120, management server 110 adds the IP zone config and the IP zone policy to the IP zone database.

Figure 12:
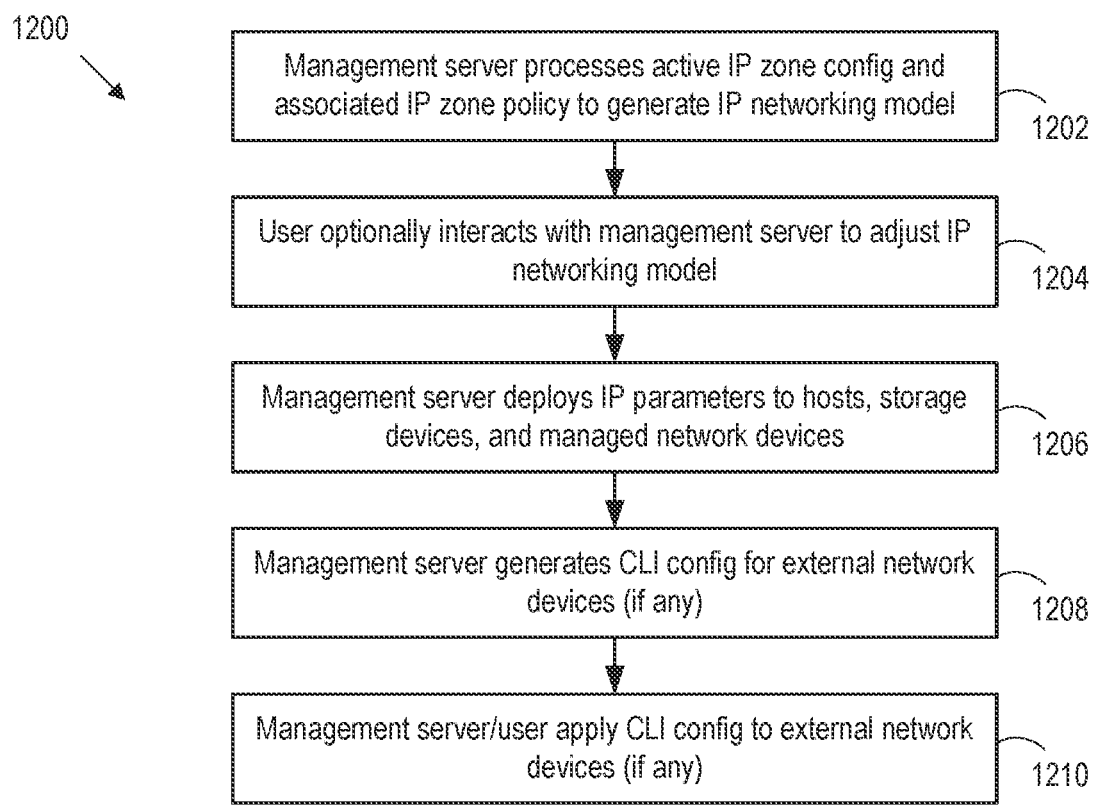
FIG. 12 is a flow diagram depicting a method of converting an IP zone model to an IP network model according to embodiments.

FIG. 12 is a flow diagram depicting a method 1200 of converting an IP zone model to an IP network model according to embodiments. Method 1200 begins at step 1202, where management server 110 processes an active IP zone config in the IP zone database and an associated IP zone policy to generate an IP zone model. For example, a user can define an IP zone as shown in the example of FIG. 8. In response, based on the IP zone policy 904, management service 110 generates an IP networking model as shown in FIGS. 3-4 to implement the IP zone.

At step 1204, the user (or software) optionally interacts with management server 110 to adjust the IP networking model. For example, a user can use configuration by IP networking view 1008 to adjust any of the auto-generated IP network parameters. At step 1206, management server 110 deploys IP parameters to hosts, storage devices, and managed network devices. Deploying IP parameters encompasses management server 110 sending the IP parameters to hosts/devices over a network with command(s) to configure their network interface(s) with the IP parameters. A command may be data including IP parameters to be configured on network interface(s). At step 1208, management server 110 optionally generates a CLI config for external network devices (if any). At step 1210, management server 110 or the user/other software applies the CLI config to external network devices (if any).

Zoning configuration and model for an IP storage network has been described. In an IP storage network hosts access shared storage over an IP network, rather than HBAs connected to an FC network. A technical problem in such an IP storage network is the end-to-end configuration of IP devices, including hosts, storage devices, networks, etc. Such configuration can require a large number of steps and is prone to error. The techniques described herein provide a technical solution to this technical problem, where a server (e.g., the management server described above) generates an IP configuration for hosts, storage devices, networks, etc. according to an IP zone policy defined for an IP zone. The server then sends commands over the IP network to the network objects (hosts, storage devices, switches, routers, etc.) to deploy the IP configuration consistent with the IP zone policy. The user need only define the IP zone policy once for a given IP zone. The user is not required to access each device individually and configure each network interface of each device individually with particular parameters, which can be error prone. The techniques described herein implement the IP zone policy consistently across a potentially large number of network objects. This consistent deployment of the IP zone policy reduces or eliminates mistakes in IP configuration, resulting in functional improvement of the IP network and the devices attached thereto.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in userspace on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. In some cases, if and where relevant, "virtualized computing instance" can encompass both VMs and containers.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A computing system, comprising:
a first group of hosts configured to connect to a first IP network;
a first group of storage devices configured to connect to a second IP network; and
a server configured to:
define an IP zone that includes a connection between the first group of hosts and the first group of storage devices over a link between the first IP network and the second IP network;
generate, according to an IP zone policy for the IP zone, an IP configuration for the first group of hosts, the first group of storage devices, the first IP network, and the second IP network; and
deploy, using commands sent over the first and second IP networks, the IP configuration to the first group of hosts, the first group of storage devices, the first IP network, and the second IP network.

2. The computing system of claim 1, wherein the link is configured to connect a first switch in the first IP network and a second switch in the second IP network, and wherein the IP configuration includes a link aggregation group (LAG) on each of the first switch and the second switch to implement the link.

3. The computing system of claim 1, wherein the IP configuration includes IP addresses for the first group of hosts and the first group of storage devices.

4. The computing system of claim 1, wherein the IP configuration includes a first virtual local area network (VLAN) on a first switch in the first IP network, the first group of storage devices connected to the first VLAN, and wherein the IP configuration includes a second VLAN on a second switch in the second IP network, the first group of storage devices connected to the second VLAN.

5. The computing system of claim 1, wherein the IP configuration includes a first static route for a first network device in the first IP network to route traffic from the first group of hosts to a second network device in the second IP network, and wherein the IP configuration includes a second static route for the second network device to route traffic from the first group of storage devices to the first network device.

6. The computing system of claim 1, wherein the IP zone policy includes permitted values for parameters in the IP configuration.

7. A method of configuring connection between hosts and storage devices over an Internet Protocol (IP) network, comprising:
   defining, by a server, a first group of the hosts and a first group of the storage devices, the hosts connected to a first IP network and the storage devices connected to a second IP network;
   defining, by the server, an IP zone that includes a connection between the first group of hosts and the first group of storage devices over a link between the first IP network and the second IP network;
   generating, by the server according to an IP zone policy for the IP zone, an IP configuration for the first group of hosts, the first group of storage devices, the first IP network, and the second IP network; and
   deploying, by the server using commands sent over the IP network, the IP configuration to the first group of hosts, the first group of storage devices, the first IP network, and the second IP network.

8. The method of claim 7, wherein the link connects a first switch in the first IP network and a second switch in the second IP network, and wherein the IP configuration includes a link aggregation group (LAG) on each of the first switch and the second switch to implement the link.

9. The method of claim 7, wherein the IP configuration includes IP addresses for the first group of hosts and the first group of storage devices.

10. The method of claim 7, wherein the IP configuration includes a first virtual local area network (VLAN) on a first switch in the first IP network, the first group of storage devices connected to the first VLAN, and wherein the IP configuration includes a second VLAN on a second switch in the second IP network, the first group of storage devices connected to the second VLAN.

11. The method of claim 7, wherein the IP configuration includes a first static route for a first network device in the first IP network to route traffic from the first group of hosts to a second network device in the second IP network, and wherein the IP configuration includes a second static route for the second network device to route traffic from the first group of storage devices to the first network device.

12. The method of claim 7, wherein the IP zone policy includes permitted values for parameters in the IP configuration.

13. The method of claim 7, further comprising generating, by the server, a command line interface (CLI) configuration for a network device in the IP network, the CLI configuration including parameters from the IP configuration.

14. A non-transitory computer readable medium comprising instructions to be executed in a computing device to cause the computing device to carry out a method of configuring connection between hosts and storage devices over an Internet Protocol (IP) network, comprising:
   defining, by a server, a first group of the hosts and a first group of the storage devices, the hosts connected to a first IP network and the storage devices connected to a second IP network;
   defining, by the server, an IP zone that includes a connection between the first group of hosts and the first group of storage devices over a link between the first IP network and the second IP network;
   generating, by the server according to an IP zone policy for the IP zone, an IP configuration for the first group of hosts, the first group of storage devices, the first IP network, and the second IP network; and
   deploying, by the server using commands sent over the IP network, the IP configuration to the first group of hosts, the first group of storage devices, the first IP network, and the second IP network.

15. The non-transitory computer readable medium of claim 14, wherein the link connects a first switch in the first IP network and a second switch in the second IP network, and wherein the IP configuration includes a link aggregation group (LAG) on each of the first switch and the second switch to implement the link.

16. The non-transitory computer readable medium of claim 14, wherein the IP configuration includes IP addresses for the first group of hosts and the first group of storage devices.

17. The non-transitory computer readable medium of claim 14, wherein the IP configuration includes a first virtual local area network (VLAN) on a first switch in the first IP network, the first group of storage devices connected to the first VLAN, and wherein the IP configuration includes a second VLAN on a second switch in the second IP network, the first group of storage devices connected to the second VLAN.

18. The non-transitory computer readable medium of claim 14, wherein the IP configuration includes a first static route for a first network device in the first IP network to route traffic from the first group of hosts to a second network device in the second IP network, and wherein the IP configuration includes a second static route for the second network device to route traffic from the first group of storage devices to the first network device.

19. The non-transitory computer readable medium of claim 14, wherein the IP zone policy includes permitted values for parameters in the IP configuration.

20. The non-transitory computer readable medium of claim 14, wherein the server is configured to generate a command line interface (CLI) configuration for a network device in the IP network, the CLI configuration including parameters from the IP configuration.

* * * * *